United States Patent [19]

Singleton

[11] Patent Number: 4,542,918

[45] Date of Patent: Sep. 24, 1985

[54] FOLDABLE WHEELCHAIRS

[75] Inventor: John M. Singleton, Salisbury, England

[73] Assignee: The Spastics Scoiety, London, England

[21] Appl. No.: 435,285

[22] Filed: Oct. 19, 1982

[30] Foreign Application Priority Data

Oct. 27, 1981 [GB] United Kingdom ................ 8132270

[51] Int. Cl.4 .............................................. B62M 1/14

[52] U.S. Cl. ................................ 280/650; 280/43.22; 280/242 WC; 280/289 WC

[58] Field of Search ............... 280/289 WC, 242 WC, 280/650, 657, 648, 43.17, 42, 767, 43.22; 180/907, 209

[56] References Cited

U.S. PATENT DOCUMENTS

| | | | |
|---|---|---|---|
| 1,322,788 | 11/1919 | Hazelton | 280/43.17 |
| 4,042,250 | 8/1977 | Rodaway | 280/650 |
| 4,098,521 | 7/1978 | Ferguson et al. | 280/242 WC |
| 4,358,125 | 11/1982 | Charles | 280/242 WC |
| 4,392,690 | 7/1983 | Anderson | 280/242 WC |

*Primary Examiner*—David M. Mitchell
*Attorney, Agent, or Firm*—Larson and Taylor

[57] ABSTRACT

A foldable wheelchair is provided of small and compact folded size for use particularly in travelling where only limited access for wheelchairs is available, e.g. on airplanes or trains. The wheelchair has two side frames (1) connected by a foldable linkage (2) operable on lifting members (6) to which the seat panel (5) is fitted with slide rods (44) being guided through cross members (11) of the side frames. The wheelchair includes front castor wheels (8) and removable rear wheels with hand rims (15) for self-propelling, and to remove the wheels (14) there is a control mechanism operable by a handle (26) to lower rear castor wheels (13) to jack the larger wheels (14) off the ground ready for detachment by lifting a pull ring (23). The control mechanism includes a brake applied to the rear castor wheels on jacking, and the rear castor wheels are biased by springs (34) into the raised position. The wheelchair can be pushed by an attendant when the wheels (14) are removed and the overall width of the wheelchair significantly reduced. The control mechanism can be operated by the wheelchair occupant.

9 Claims, 5 Drawing Figures

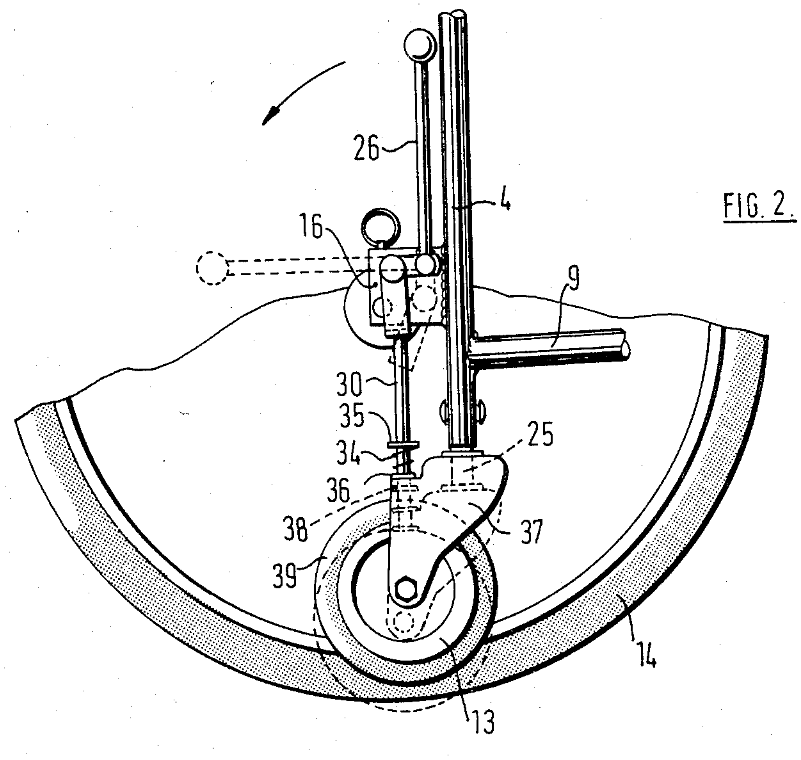
FIG. 2.
FIG. 3.
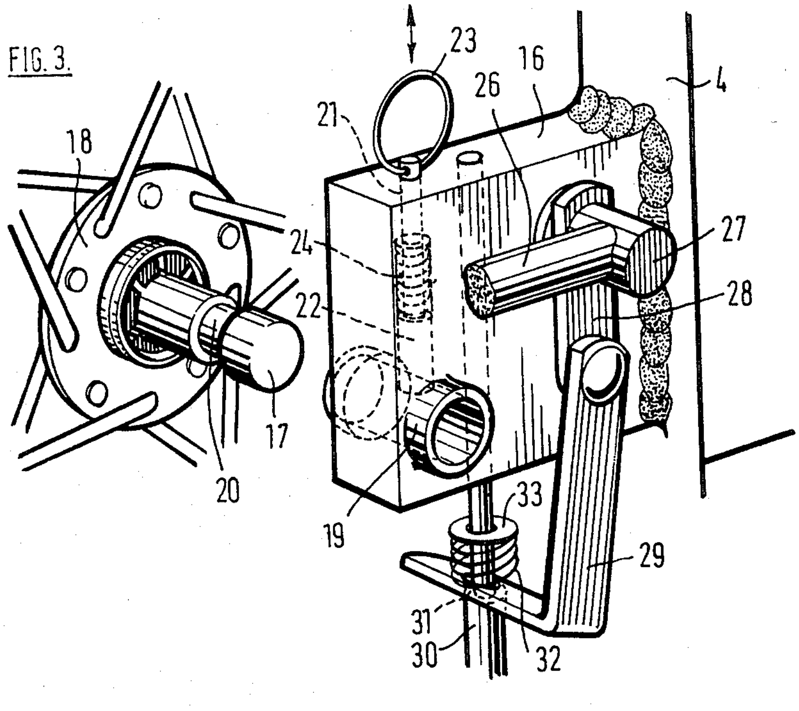

FIG. 4.
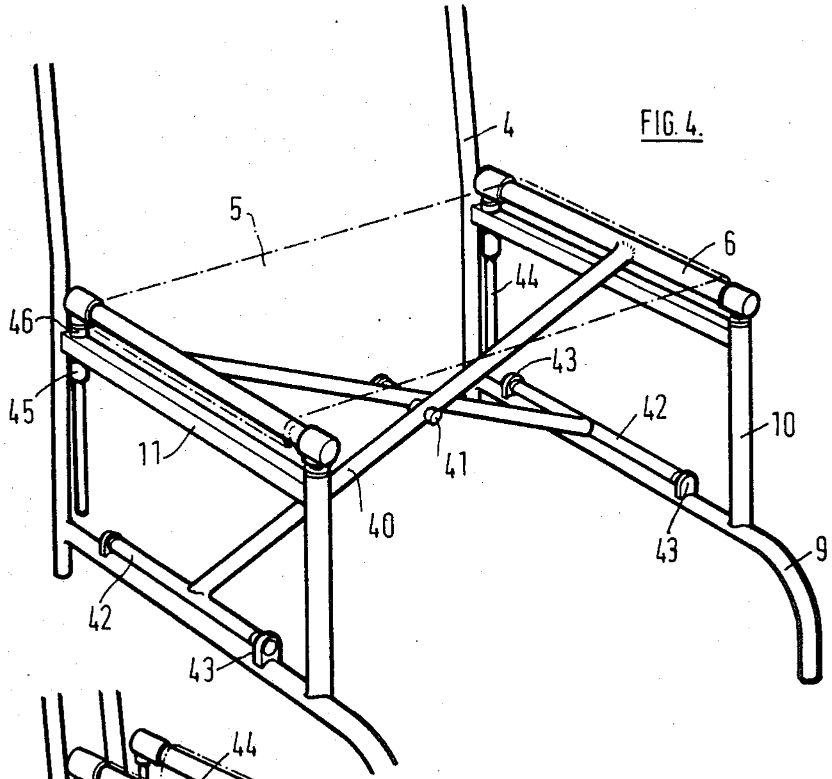
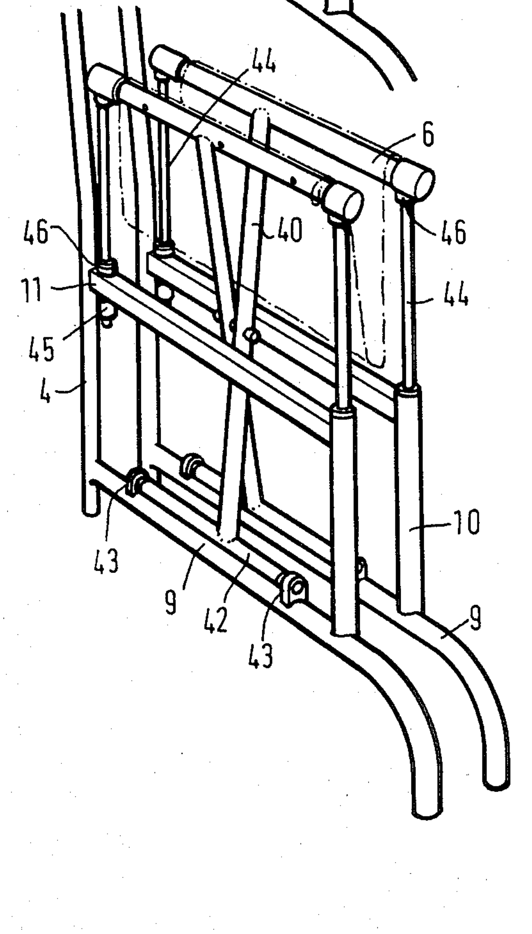
FIG. 5.

FOLDABLE WHEELCHAIRS

BACKGROUND OF THE INVENTION

This invention concerns improvements in foldable wheelchairs and is particularly related to wheelchairs for manual driving by the user or an attendant.

The conventional manual wheelchair for self-propulsion by the user has large front or rear wheels with hand-rims which are used for advancing the wheelchair. The overall width of such wheelchairs is often too great to permit the user manoeuvering in constricted passages or aisles or through narrow openings. A particular problem arises when the user travels on public service transport, such as trains or aircraft.

It is often inappropriate or impossible for the disabled user to be transferred bodily between entrances and/or exits or around the typical constriction which impedes normal wheelchair use. Indeed in many environments, there are no facilities for assisting the wheelchair user and the gangways may be too narrow to carry a disabled person.

It is possible to provide special wheeled transporters or trolleys, but these have limited use as one or more attendants are required and the disabled person has little or no control and is wholly reliant on the attendant(s) whilst in the special transporter.

Another problem which is most prevalent in foldable wheelchairs is that even in the foldable state, the dimensions are too wide for convenient stowage, say in a normal luggage hold or compartment.

It is an object of this invention to provide an improved foldable wheelchair which overcomes the foregoing problems in a simple and expedient manner of construction.

It is an object of this invention to provide an improved foldable wheelchair adapted for self-propelling use or attendant use, and of which the width may be reduced to permit manoeuvering under the control of an attendant whilst still safely transporting the seated user.

It is a further object of this invention to provide an improved foldable wheelchair of particularly compact construction having a special form of foldable link.

Other objectives of this invention and advantages derived from the invented improved wheelchair will be understood from the description of a preferred embodiment given later herein.

SUMMARY OF THE INVENTION

According to this invention we provide a foldable wheelchair comprising two side frame assemblies connected together by a foldable link to which a flexible seat panel is secured extending between the two side frame assemblies, the two side frame assemblies each having a rear upright member to which a flexible back panel is secured also extending between the two side frame assemblies, each side frame assembly mounting a forward castor wheel and rear castor wheel with the rear castor wheel being supported on the respective rear upright member for vertical movement relative thereto by a manually operable control mechanism, and each side frame assembly including a releasable mounting for a further wheel arranged to extend outboard and adjacent to the respective rear castor wheel and adapted for manual self-propulsion of the wheelchair, the arrangement of the pair of rear castor wheels being such that in a raised position the pair of further wheels engage the ground for manual driving of the wheelchair, and by operation of each control mechanism the respective rear castor wheels are lowered to engage the ground whereby the respective further wheels may be removed from their respective mounting with subsequent advancement of the wheelchair being achieved on the forward and rear castor wheels.

By this special arrangement, the rear castor wheels are idle during normal use of the wheelchair propelled by the user through the pair of further wheels. On removal of this pair of further wheels outboard of the rear castor wheels, the width of the wheelchair is considerably reduced but without difficulty can still be used to transport the user seated in the wheelchair.

Furthermore, with the further wheels removed, the wheelchair may be folded so that the two side frames lie closely adjacent, and due to the absence of the outboard further wheels, in the folded state the wheelchair is of compact narrow dimensions. Additionally, as will be appreciated, the further wheels may be stowed separately in compact form for remounting on the wheelchair when required.

Preferably, each control mechanism includes a handle mounted for swinging movement from a first position to a second position with the handle being located relative to the respective rear upright of the frame for accessible actuation by the user seated on the wheelchair.

By such an arrangement, the user may actuate the control mechanism personally to either remove or replace the pair of further wheels. This means that the requirement for an attendant is kept to a minimum solely for the special manoeuver required.

Conveniently, the wheelchair includes brake means for preventing rolling movement of the wheelchair. Preferably, such brake means is arranged to act on each respective rear castor wheel. The brake means is associated with each control mechanism and is arranged to apply a frictional restraint on the tyre of the respective rear castor wheel when in the lowered position.

By such braking arrangement, when the rear castor wheels are lowered to the position ready, if desired to remove the further pair of wheels, the wheelchair is automatically prevented from rolling movement whilst the steps of removing the further wheels are completed. Furthermore, the brake means may be applied when the wheelchair is in the narrow mode with only the fore and rear castor wheels engaging the ground. This has advantages if the user is to remain in the wheelchair whilst conveyed in a bus, train or plane.

The releasable mounting for each further wheel may comprise a spring loaded pin mounted in a block secured to the respective rear upright frame member and the wheel axle including a stub axle arranged to be mounted in said block and located therein by the pin.

According to such a releasable arrangement, the spring loaded pin may be actuated by the user to release the respective further wheel and then remove the further wheel by a transverse movement withdrawing the stub axle from the block.

Each block may also mount the control mechanism. This arrangement enables a simple and neat construction.

Each rear castor wheel is preferably slidably mounted in the respective rear upright of the side frame and there is a control rod mounted in the block for sliding movement on actuation of the control handle to move the respective rear castor wheel against spring means biassing the said rear castor wheel into the raised position.

Thus, each rear castor wheel is supported and guided for the movement relative to the respective rear upright and is retained in the raised position when the associated further wheel is mounted on the block.

Conveniently, the control rod is provided with a foot which on actuation of the control mechanism to lower the associated rear castor wheel engages the tire of the said castor wheel to thereby provide the braking action.

This arrangement also provides a neat and compact assembly minimising weight of the wheelchair.

In the wheelchair, the foldable link connecting the two side frames is also of special construction avoiding the conventional arrangement of several foldable link structures which have to be locked or pushed over-center to hold the wheelchair rigidly extended.

The foldable link of the wheelchair comprises two cross struts extending under the seat panel and pivotally connected at their centres, the upper end of each cross strut having connected thereto a transverse side member to which the seat panel is secured, and each transverse side member being slidably located in the respective side frame of the wheelchair between a lowered position in which the wheelchair is extended and a raised position for folding of the wheelchair.

Preferably, each said transverse side member is slidably located by dependent slide rods arranged to extend through slideways in the respective side frame of the wheelchair. Conveniently, there is one slide rod at each opposed end of the transverse side member.

By this arrangement, the movement of the slide rods relative to the slideways of the respective wheelchair side frames controls the pivotal movement of the two cross struts and thus, the folding movement of the wheelchair. When the slide rods are in the lowered position, the seat panel is extended and when the weight of an occupant is on the seat panel the wheelchair cannot be folded.

Preferably, the lower end of each cross strut is connected to the respective wheelchair side frame by a swivel tube extending transversely of the respective strut and mounted in pivot bearings.

Accordingly, the loads and stresses arising in use of the wheelchair are uniformly distributed to the respective side frames of the wheelchair.

Conveniently, the front castor wheels are mounted for castoring action on the front of each side frame, and adjacent to each front castor wheel there is a foot rest extending transverse of the respective side frame for folding movement.

This construction also provides a compact size on folding of the wheelchair.

Other features of this invention will now be described with reference to an exemplary embodiment of a wheelchair according to this invention depicted in the accompanying drawings.

BRIEF DESCRIPTION OF THE DRAWINGS

FIG. 2 is a side view showing a detail of the associated rear wheels on one side of the wheelchair with the view depicting the operative positions of a castor wheel relative to a self-propelling wheel;

FIG. 3 is a perspective view showing a detail of the releasable coupling for the self-propelling wheel;

FIG. 4 is a perspective view of part of the wheelchair showing the folding linkage in the extended position; and FIG. 5 is a perspective view of part of the wheelchair showing the folding linkage in the folded position.

DESCRIPTION OF THE PREFERRED EMBODIMENT

Figure 1:
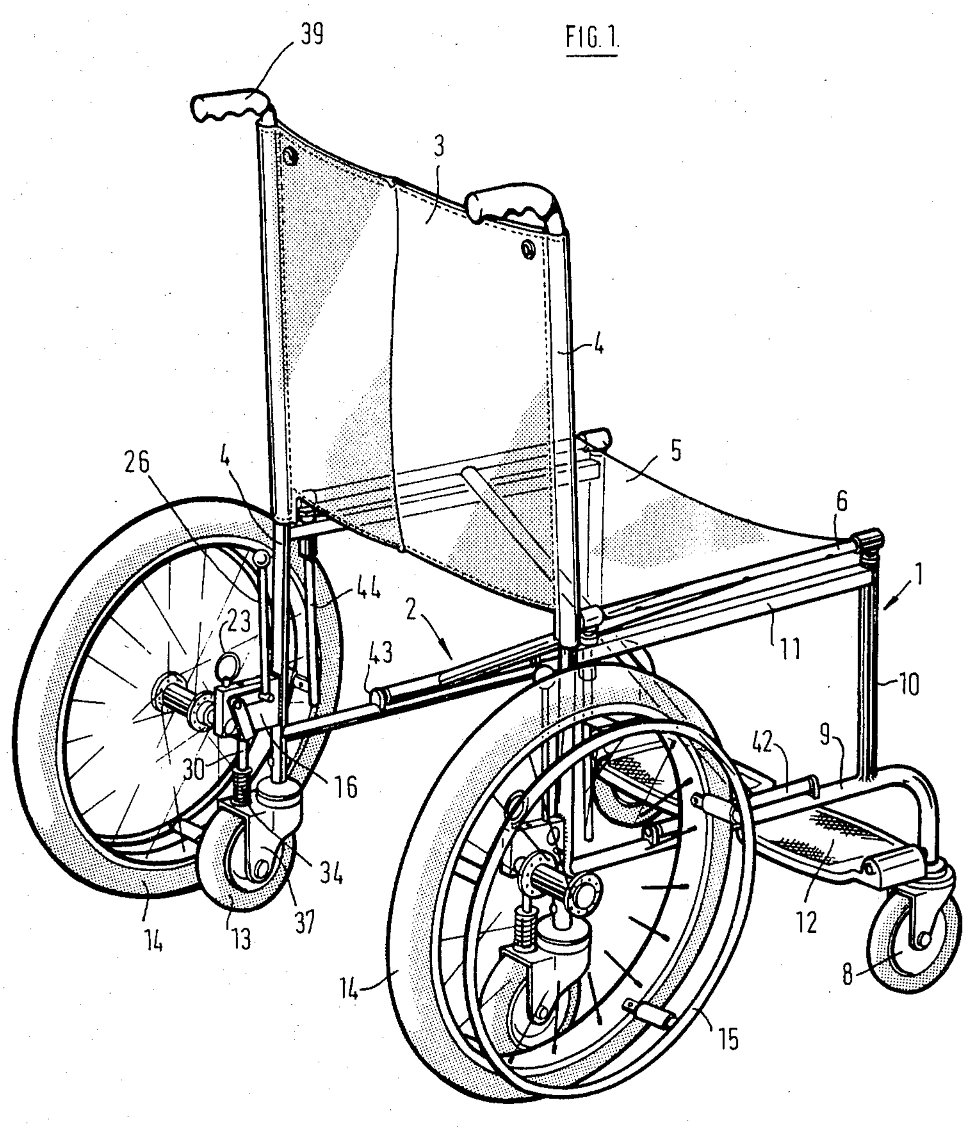
FIG. 1 is a perspective view of a wheelchair according to this invention shown in the mode for self-propulsion by the user.

The wheelchair as depicted in the accompanying drawings comprises a tubular frame having two opposed and similar side frame assemblies 1 between which a foldable linkage 2 extends. A back-rest panel 3 of flexible material extends between the respective rear uprights 4 of each side frame and a seat panel 5 also of flexible material extends between opposed side members 6 of the linkage 2. Each panel 3,5 is secured to the associated frame or linkage members and as depicted in FIG. 1 provides the back and seat support for the user.

The wheelchair further comprises a forward pair of castor wheels 8 each mounted for castoring or swivelling movement on a dependent end portion of a lower cross member 9 of the respective side frame assembly 1. The cross member 9 extends between the rear upright 4 and a hollow front upright 10, and there is an upper cross member 11 spaced above cross member 9 and also connected to the rear upright 4 and front upright 10. Pivotally mounted on each dependent end portion of the lower cross member 9 adjacent to the respective castor wheel 8 is a footrest 12 arranged to extend inboard of the respective side frame as shown in FIG. 1, and to hinge upwardly to lie upright against the respective side frame members when the wheelchair is folded or if the footrests are not required.

To the rear of the wheelchair there are two pair of wheels, these being a pair of vertically adjustable castor wheels 13 each mounted on a respective rear upright 4 and a pair of larger wheels 14 for use in self-propulsion of the wheelchair by manual control through hand rims 15. Each wheel 14 is mounted outboard of the associated castor wheel 13 and is detachably supported from a block 16 secured to the lower end of the respective rear upright 4.

As best shown in FIGS. 2 and 3, the wheel 14 has a stub axle 17 projecting from the hub 18 of the wheel and arranged to be supported in a bearing bush 19 mounted in the block 16. The axle 17 is provided with an annular groove 20 arranged to receive one end of a locating pin 21 which is mounted in a bore 22 in the block and having a pull ring 23 at the other end which is exposed at the top of the block. A spring 24 mounted in the bore 22 serves to urge the pin 21 into engagement with the groove 20 to hold the wheel 14 in rotatable bearing engagement in the block, but on pulling upwards on the ring 23, the pin 21 may be disengaged to release the wheel 14 and permit removal on lateral displacement of the stub axle 17 from the bush 19.

In the self-propelling mode of the wheelchair shown in FIGS. 1 and 2 the wheels 14 are at an attitude lower than each of the rear castor wheels 13 which are maintained in a raised position (as described later) with each castor shaft 25 being slidably retained within the bottom end of the associated rear upright 4. The castor wheels 13 do not swivel and are only arranged for controlled vertical movement. Each rear castor wheel 13 is arranged to be manually lowered either by the user or an attendant by operation of a control mechanism actuated by swinging a control handle 26 so that the castor wheel 13 is moved into the lowered position shown in broken outline in FIG. 2 causing the associated larger wheel 14 to be lifted from the ground out of engagement to permit removal as before described.

Each control mechanism is also mounted on a respective one of the blocks 16. The control handle 26 is fixed to a shaft 27 mounted for limited rotation between two extreme positions in the block 16, and the shaft carries a fixed lug 28 pivotally coupled to a cranked link 29 of which the cranked end is pierced with a control rod 30 extending therethrough. A bore in the block slidably receives one end of the control rod 30 and the link 29 engages a shoulder 31 on the rod with a spring 32 and flange 33 mounted on the rod above the shoulder maintaining the link 29 in such engagement.

The other end of the control rod 30 carries a return spring 34 interposed between a flange 35 mounted on the rod and a collar 36 surrounding a bore through the yoke 37 of the castor wheel. The lower end of the control rod is provided with a foot 38 which, on lowering of the control rod 30, engages the tire 39 of the castor wheel and transmits downward movement of the control rod 30 to the castor wheel to lower same against the spring bias of the return spring 34. The engagement of the foot 38 with the tire also provides a friction brake to prevent rotation of the castor wheel.

As will be appreciated with reference to FIG. 2, in the self-propelling mode, on each side of the wheelchair the castor wheel 13 is raised relative to the wheel 4 and maintained in this position by the return spring 34. On swinging movement of the handle 26 into the lowered position, the cranked link 29 is moved downwards by the lug 28 and due to its engagement with the shoulder 31 so urges the control rod downwards with the foot 38 being pressed onto the tire to firstly displace the castor wheel downwardly until it reaches its limit defined by the slidable retention in the rear upright 4. Subsequent final movement of the control handle causes the foot 38 to be forced into hard braking engagement with the tire so that the wheelchair is maintained stable against rolling movement whilst the user or attendant removes the larger wheels 14 as aforedescribed.

After the self-propelling wheels have been removed, the control handles 26 may be raised to release each foot 38 from the respective tire, in effect "taking off the brake". On release of this braking action, the wheelchair is ready for attendant controlled movement by conventional handles 39 on the upper ends of each rear upright.

In this attendant pusher mode, the width of the wheelchair is very small enabling the wheelchair to be manoeuvered through narrow gangways or doors, and the two removed large wheels may be carried separately, even on the user's lap. The control handle(s) may be operated whilst the wheelchair is in this pusher mode to provide braking as required, and the self-propelling wheels may be refitted when desired or convenient.

The wheelchair is foldable in the self-propelling or the attendant pusher mode and will now be described with reference in particular to FIGS. 1, 4 and 5.

The foldable link 2 extends between the two side frames 1 and has two cross struts 40 connected at their centres by a pivot pin 41. Attached to the upper end of each respective strut 40 is the transverse side members 6 to which the seat panel 5 is secured. The lower end of each respective strut 40 has a transverse swivel tube 42 rigidly connected thereto and this tube 42 is mounted between trunnion bearings 43 on the respective lower cross member 9 of the side frame 1.

Each end of each side member 6 of the foldable link has a dependent slide rod 44 secured thereto. Each forward slide rod 44 is slidably received within the respective hollow front frame member 10, and each rear slide rod 44 extends through a slide bush 45 mounted in the respective upper cross member 11 adjacent the associated rear upright 4.

As shown in FIGS. 1 and 4, when the wheelchair is in the extended state, the slide rods 44 depend through their slideways constituted by the members 10 and bushes 45 and the side members 6 each overlie the upper cross members 11 of the side frames. Small spacers 46 on the slide rods or slideways provide a small clearance for the material of the seat panel 5.

When the slide rods 44 are in this lowered abutting position it is not possible to fold the linkage 2. Folding movement can only be achieved by lifting each side member 6 to raise the slide rods 44, which movement causes the cross struts 40 to pivot on the pin 41 and the swivel tubes 42 to rotate on their bearings 43 until the fully folded position shown in FIG. 5 is achieved.

There is no separate locking or interlocking means associated with the folding link assembly 2 and, when the weight of an occupant is centered on the seat panel 5 it is not possible for the slide rods to lift.

The merits of the wheelchair according to this invention will be understood from the embodiment as just described, but particular attention is drawn to the compact and lightweight construction with the option under the personal control of the user to drive the wheelchair or to remove the larger wheels to significantly reduce the width of the wheelchair. Stability is provided by the relatively long wheel base and the position of the foot rests.

It is envisaged that the releasable means for removing each larger rear wheel may be modified to provide a different type of interlock without departing from the principle hereinbefore described.

Furthermore, the specific construction of the tubular frame elements may be varied and the relative sizes of the castor and self-propelling wheels.

I claim:

1. A foldable wheelchair comprising two side frame assemblies connected together by a foldable link to which a flexible seat panel is secured extending between said two side frame assemblies, said two side frame assemblies each having a rear upright frame member to which a flexible back panel is secured also extending between said two side frame assemblies, each said side frame assembly mounting a front castor wheel, a rear castor wheel and a further rear wheel positioned outboard and adjacent to said rear castor wheel, each said rear castor wheel being slidably supported on the respective rear upright frame member for vertical movement relative to said adjacent further rear wheel between a raised position and a lowered position, respective spring means biassing each said rear castor wheel to said raised position, a respective manually operable control mechanism for each said rear castor wheel, each said control meachanism including a handle located relative to the respective rear upright frame member for accessbile actuation by the user seated on the wheelchair, each said handle being mounted for swinging movement from a first postion to a second position and being operatively connected to a respective control rod to move the respective rear castor wheel to the lowered position against said spring means on actuation of said handle and, a respective releasable mounting for each said further rear wheel whereby, in said raised position, each said rear castor wheel is clear of the ground and each said adjacent further rear wheel engages the ground for manual self-propulsion of the wheelchair by the user seated on the wheelchair and, in said lowered position, each said rear castor wheel engages the ground and each said adjacent further rear wheel is raised clear of the ground to permit removal of said further rear wheel from the respective mounting with subsequent advancement of the wheelchair being achieved on said front and said rear castor wheels.

2. A wheelchair according to claim 1 wherein said releasible mounting for each said further wheel comprises a sprung loaded pin mounted in a block secured to the respective rear upright frame member and the respective further wheel has a wheel axle including a stub axle arranged to be mounted in said block and located therein by said pin.

3. A wheelchair according to claim 2 wherein each said block mounts the respective said control mechanism for each said rear castor wheel, and each said control rod is slidably supported in said associated block.

4. A wheelchair according to claim 3 wherein each said control rod is provided with a foot which on actuation of said control mechanism to lower the associated rear castor wheel engages the tire of the said rear castor wheel to provide braking action.

5. A wheelchair according to claim 1 wherein said foldable link of the wheelchair comprises two cross struts extending under said seat panel and pivotally connected at their centres, the upper end of each said cross strut having connected thereto a transverse side member to which said seat panel is secured, and each said transverse side member being slidably located in the respective side frame assembly of the wheelchair between a lowered position in which the wheelchair is extended and a raised position for folding of the wheelchair.

6. A wheelchair according to claim 5 wherein each said transverse side member is slidably located by dependent slide rods arranged to extend through slideways in the respective side frame assembly of the wheelchair.

7. A wheelchair according to claim 6 wherein there is one slide rod at each opposed end of said transverse side member.

8. A wheelchair according to claim 7 wherein the lower end of each said cross strut is connected to the respective wheelchair side frame assembly by a swivel tube extending transversely of the respective strut and mounted in pivot bearings.

9. A wheelchair according to claim 8 wherein said front castor wheels are mounted for castoring action on the front of each side frame assembly, and adjacent to each said front castor wheel there is a footrest extending transverse of the respective side frame assembly for folding movement.

* * * * *